(12) United States Patent
Hohimer et al.

(10) Patent No.: US 8,655,809 B2
(45) Date of Patent: *Feb. 18, 2014

(54) DATA STRUCTURES AND APPARATUSES FOR REPRESENTING KNOWLEDGE

(75) Inventors: Ryan E. Hohimer, West Richland, WA (US); Judi R. Thomson, Guelph (CA); William J. Harvey, Columbus, OH (US); Patrick R. Paulson, Richland, WA (US); Mark A. Whiting, Richland, WA (US); Stephen C. Tratz, Boise, ID (US); Alan R. Chappell, Seattle, WA (US); Robert S. Butner, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 87 days.

This patent is subject to a terminal disclaimer.

(21) Appl. No.: 13/187,275

(22) Filed: Jul. 20, 2011

(65) Prior Publication Data

US 2011/0276524 A1 Nov. 10, 2011

Related U.S. Application Data

(63) Continuation of application No. 11/237,483, filed on Sep. 27, 2005, now Pat. No. 8,023,739.

(51) Int. Cl.
*G06N 5/00* (2006.01)
*G06F 1/00* (2006.01)

(52) U.S. Cl.
USPC .................. 706/12; 704/4; 709/217

(58) Field of Classification Search
USPC .......................................... 706/12
See application file for complete search history.

(56) References Cited

U.S. PATENT DOCUMENTS

| 2005/0004930 A1* | 1/2005 | Hatta ............................. 707/102 |
| 2006/0074836 A1* | 4/2006 | Gardner et al. ................. 706/60 |

* cited by examiner

*Primary Examiner* — Kakali Chaki
*Assistant Examiner* — Kalpana Bharadwaj
(74) *Attorney, Agent, or Firm* — Allan C. Tuan

(57) ABSTRACT

Data structures and apparatuses to represent knowledge are disclosed. The processes can comprise labeling elements in a knowledge signature according to concepts in an ontology and populating the elements with confidence values. The data structures can comprise knowledge signatures stored on computer-readable media. The knowledge signatures comprise a matrix structure having elements labeled according to concepts in an ontology, wherein the value of the element represents a confidence that the concept is present in an information space. The apparatus can comprise a knowledge representation unit having at least one ontology stored on a computer-readable medium, at least one data-receiving device, and a processor configured to generate knowledge signatures by comparing datasets obtained by the data-receiving devices to the ontologies.

9 Claims, 7 Drawing Sheets

Fig. 5a

Initialized Knowledge Signatures

| | |
|---|---|
| Long Wheelbase | −1.0 |
| Medium Wheelbase | −1.0 |
| Short Wheelbase | −1.0 |
| Truck | −1.0 |
| Sedan | −1.0 |
| SUV | −1.0 |

| | |
|---|---|
| Long Wheelbase | −1.0 |
| Medium Wheelbase | −1.0 |
| Short Wheelbase | −1.0 |
| Truck | −1.0 |
| Sedan | −1.0 |
| SUV | −1.0 |

Fig. 5b

| | | "Late Model Pick Up" |
|---|---|---|
| Long Wheelbase | 0.9 | −1.0 |
| Medium Wheelbase | 0.2 | −1.0 |
| Short Wheelbase | 0.0 | −1.0 |
| Truck | −1.0 | 0.8 |
| Sedan | −1.0 | 0.8 |
| SUV | −1.0 | 0.8 |

Fig. 5c

| | | "Late Model Pick Up" |
|---|---|---|
| Long Wheelbase | 0.9 | 1.0 |
| Medium Wheelbase | 0.2 | 0.0 |
| Short Wheelbase | 0.0 | 0.0 |
| Truck | 0.9 | 0.8 |
| Sedan | 0.0 | 0.0 |
| SUV | 0.0 | 0.0 |

Fig. 5d

| | | "Late Model Pick Up" |
|---|---|---|
| Long Wheelbase | 0.9 | 1.0 |
| Medium Wheelbase | 0.2 | 0.0 |
| Short Wheelbase | 0.0 | 0.0 |
| Truck | 0.9 | 0.8 |
| Sedan | 0.0 | 0.0 |
| SUV | 0.0 | 0.0 |

DATA STRUCTURES AND APPARATUSES FOR REPRESENTING KNOWLEDGE

CROSS-REFERENCE TO RELATED APPLICATIONS

This invention claims priority to, and is a continuation of, currently pending U.S. patent application Ser. No. 11/237,483, which was filed on Sep. 27, 2005. The entirety of the application is incorporated herein by reference.

STATEMENT REGARDING FEDERALLY SPONSORED RESEARCH OR DEVELOPMENT

This invention was made with Government support under Contract DE-AC0576RLO1830 awarded by the U.S. Department of Energy. The Government has certain rights in the invention.

BACKGROUND

Collection, integration and analysis of large quantities of data are key activities for intelligence analysts, search engines, and other entities that handle volumes of information. Such activities are commonly without adequate automated support. Data signatures represent one tool of automation and can refer to statistically identifiable characteristics of data that can be used to differentiate a specific subset of data from other similar data. Often, data signatures are calculated using the vocabulary of the documents. However, data signatures can sometimes fail to capture relationships between concepts and to differentiate the documents' semantics. For example, consider two documents, one about smoking as a health hazard and one about methods to quit smoking. Even though the documents might be significantly different, data signatures for the two documents can be very similar since the documents may contain many common terms. Accordingly, a need exists for processes, data structures, and apparatuses to represent knowledge that can consider the context and/or task of the user when representing data, obtain information about the data at a semantic level, and allow applications to compare knowledge with one another.

SUMMARY

One aspect of the present invention encompasses a process for representing knowledge. The process comprises labeling elements in a knowledge signature according to concepts in an ontology and populating the elements with confidence values. Confidence values represent a confidence that the concepts are present in an information space. Knowledge signatures can be structured as a matrix of the elements. For example, in one embodiment, the knowledge signatures are real-valued vectors.

In one version, populating the elements can comprise generating an observed confidence value from a dataset according to an observation engine. Datasets can comprise information including, but not limited to, text documents, video segments, audio segments, images, graphs, database records, sensor data, and combinations thereof. Accordingly, embodiments of the observation engine include, but are not limited to, program modules on computer-readable media having image, text symbol, and audio recognition software components.

In another version, observed confidence values can be determined by generating a concept signature for each concept in the ontology, generating at least one dataset signature from a dataset, and performing a similarity measure between the concept signatures and the dataset signatures. Examples of similarity measures include, but are not limited to Euclidean distances and cosine coefficients. In this instance, the similarity measures are used to populate the elements in a knowledge signature.

Populating the elements can further comprise generating inferred confidence values from at least one observed confidence value according to at least one refinement engine. An embodiment of the refinement engines encompasses a program module on a computer-readable medium, wherein the program comprises definitions of concept relationships. Examples of concept relationships include, but are not limited to subsumption ("is a"), aggregation ("has a"), and other relational attributes.

Some embodiments of the present invention further comprise comparing a plurality of knowledge signatures, wherein each knowledge signature is generated from a different dataset. The data sets can comprise disparate data types, for example, text and video. Comparing the knowledge signatures can comprise transforming the knowledge signatures into reduced-dimensional representations, and performing a similarity measure between the transformed knowledge signatures, which similarity measure can include, but is not limited to Euclidian distances and cosine coefficients.

Another aspect of the present invention encompasses a computer-readable medium having stored thereon a knowledge signature. The knowledge signature comprises a matrix structure having elements labeled according to concepts in an ontology, wherein the value of the element represents a confidence that the concept is present in an information space. In one embodiment, the knowledge signature is a real-valued vector.

Yet another aspect of the present invention encompasses an apparatus comprising a knowledge representation unit. The knowledge representation unit comprises at least one ontology stored on a computer-readable medium, at least one data-receiving device, and a processor. The processor is communicably connected to the computer-readable medium and the data-receiving devices and generates knowledge signatures by comparing datasets obtained by the data-receiving devices to the ontologies. Examples of datasets can include, but are not limited to, text documents, images, audio segments, video segments, database records, and graphs. Accordingly, data-receiving devices can include, but are not limited to, audio sensors, video sensors, scanners, image sensors, optical character recognition devices, keyboards, pointing devices, network cards, and modems.

The knowledge representation unit can further comprise at least one observation engine that populates the knowledge signatures with observed confidence values. It can also comprise at least one refinement engine that modifies the knowledge signatures with inferred confidence values.

Some embodiments of the knowledge representation unit can further comprise a distancing engine. According to the distancing engine, the processor can perform similarity measures between a plurality of knowledge signatures.

In one embodiment, the knowledge representation unit further comprises a communications port allowing the apparatus to interface with other computational devices, wherein the communications port supports wired and/or wireless communications. Therefore, the knowledge representation unit can encompass any such computational device that is communicably connected, which computational device receives a knowledge signature via the communications port.

The knowledge representation unit further comprises a display whereon knowledge signatures are represented as graphs having concept labels on the abscissa and confidence values on the ordinate.

DESCRIPTION OF DRAWINGS

Embodiments of the invention are described below with reference to the following accompanying drawings.

FIGS. 5(a)-(d) illustrate the inferring of confidence values by a refinement engine.

DETAILED DESCRIPTION

For a clear and concise understanding of the specification and claims, including the scope given to such terms, the following definitions are provided.

Figures 1A, 1B:
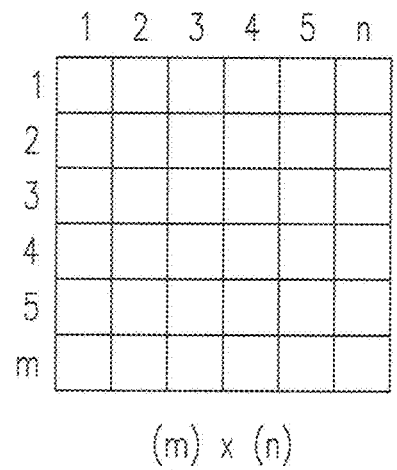
FIGS. 1(a) and (b) are illustrations of embodiments of a knowledge signature.

A Knowledge signature, as used herein, can refer to a machine-readable construct that captures the semantics of data within a particular context or domain as defined in an ontology. The construct can comprise a data structure derived from an ontology. The knowledge signature can be arranged as a matrix of elements and can facilitate quantitative comparison of semantic information. Each element characterizes the strength of association between the dataset and at least one concept described by the ontology. The elements are each labeled, or indexed, with a specific concept from the ontology. In one embodiment, the knowledge signature comprises a real-valued vector. Elements of the vector can be populated with confidence values that represent the confidence that the associated concepts are present in an information space. Knowledge signatures can be stored on computer-readable media, including, but not limited to, random access memory, read-only memory, optical storage disks, and magnetic storage disks. An example of a knowledge signature is illustrated in FIG. 1(a) as a matrix, and in FIG. 1(b) as a vector, where $x_i$ are confidence values.

Confidence values, as used herein, can refer to calculated values that represent a confidence that the concepts in a knowledge signature are present in a data set and/or an information space. Observed confidence values are those that have been determined by an observation engine applied to a data set. Since it is directly observed from a data set, an observed confidence value pertains to a concept's presence in the respective data set. Inferred confidence values are those that have been determined by a refinement engine applied to observed confidence values. Inferred confidence values are determined according to predefined relationships between concepts. Thus, for example, inferred confidence values can be determined according to the presence or absence of other observed confidence values. As such, an inferred confidence value can pertain to a concept's presence in an information space supported by the data set, but not necessarily in the data set itself.

Ontology, as used herein, can refer to a formal, machine-readable representation of concepts and their relationships within a domain. The representation can permit the rich expression of ideas in a machine processable form. Ontologies can call out concepts in the domain as well as the relationships between the concepts. Relationships can include, but are not limited to, subsumption, aggregation, and other relational attributes. Related and/or similar concepts in an ontology can be grouped into mode groups. Examples of ontologies include, but are not limited to, lexicons, taxonomies, and networked expressions of concepts having complex relationships. One of the ways to visually represent an ontology is with nodes and links. Concepts can be represented as nodes while certain types of relationships (e.g., parent-child and/or sibling) can be represented by links.

A dataset, as used herein refers to a target volume of data to be characterized by a knowledge signature. The dataset can comprise one or more information-containing items including, but not limited to, text documents, video segments, audio segments, images, graphs, and sensor data. In contrast, information space refers to knowledge that the data set supports, which knowledge exists in an ontology but may not exist literally in the dataset. For example, a dataset regarding children might include baby portraits, children's videos, lullabies, books regarding care and feeding, and/or graphs of average height and weight as a function of age. There may, however, be no specific items that reference fatherhood. In spite of the lack of information on fathers, the dataset supports their existence based on knowledge contained in a related ontology. Accordingly, a knowledge signature may contain an element having a high confidence value regarding the concept of fathers, even though no such concept was observed in the dataset.

A mode group refers to a group of related or sibling concepts in an ontology that are semantically disjoint and are, therefore, mutually exclusive. Accordingly, the concepts in a mode group can make up the domain of a discrete random variable. The mode group can comprise concepts that have at least one common property including, but not limited to, color, size, shape, location, or function.

As used herein, an observation engine refers to a program module on a computer-readable medium that is configured to recognize a particular concept in a data set. Therefore, in one embodiment of the present invention, each of a plurality of observation engines is assigned to at least one element in a knowledge signature and, thus, can recognize the concept associated with the element to which it is assigned. The observation engines correspond with the nature of the data in a dataset and/or its associated concept. For example, if a dataset comprises image files and text documents, observation engines that have image recognition and text symbol recognition software could be implemented.

Refinement engine, as used herein, can refer to a program module on a computer-readable medium that is configured to infer the presence of concepts that are related to those recognized by the observation engines. Accordingly, the refinement engines comprise definitions of relationships between concepts. The relationships can be based on an ontology and can include, for example, subsumption, aggregation, and/or position.

Distancing engine, as used herein, can refer to a software agent that is configured to determine the semantic similarity of at least two knowledge signatures.

Matrix, as used herein, can refer to the organizational structure of elements in a knowledge signature, which is stored on a computer-readable medium. Therefore, it can comprise a data array of one or more dimensions. One embodiment of a knowledge signature having a matrix structure encompasses a vector having one row and n columns (FIG. 1b). The element in each column can be labeled (e.g., by indexing the element) according to concepts in an ontology and populated with a confidence value. Vectors that become so long as to make visualization more difficult can "wrap" the elements onto in additional rows, thereby forming a m×n matrix.

In another embodiment, the knowledge signature comprises a matrix structure having m rows and n columns (FIG. 1a). As in a vector, the elements in each column can be labeled according to concepts in an ontology and populated with confidence values. The rows can contain a record of providence. For example, the rows can show a history of a knowledge signature that has been populated by observation engines and updated by refinement engines. Accordingly, a first row can comprise a knowledge signature having observed confidence values. A second row can comprise the knowledge signature having observed confidence values and inferred confidence values resulting from implementation of a refinement engine. Subsequent rows can comprise knowledge signatures that are further refined.

In yet another embodiment, the knowledge signature can comprise a matrix structure having m rows and n columns, wherein the rows are used to delineate concepts according to mode groups.

Figure 2:
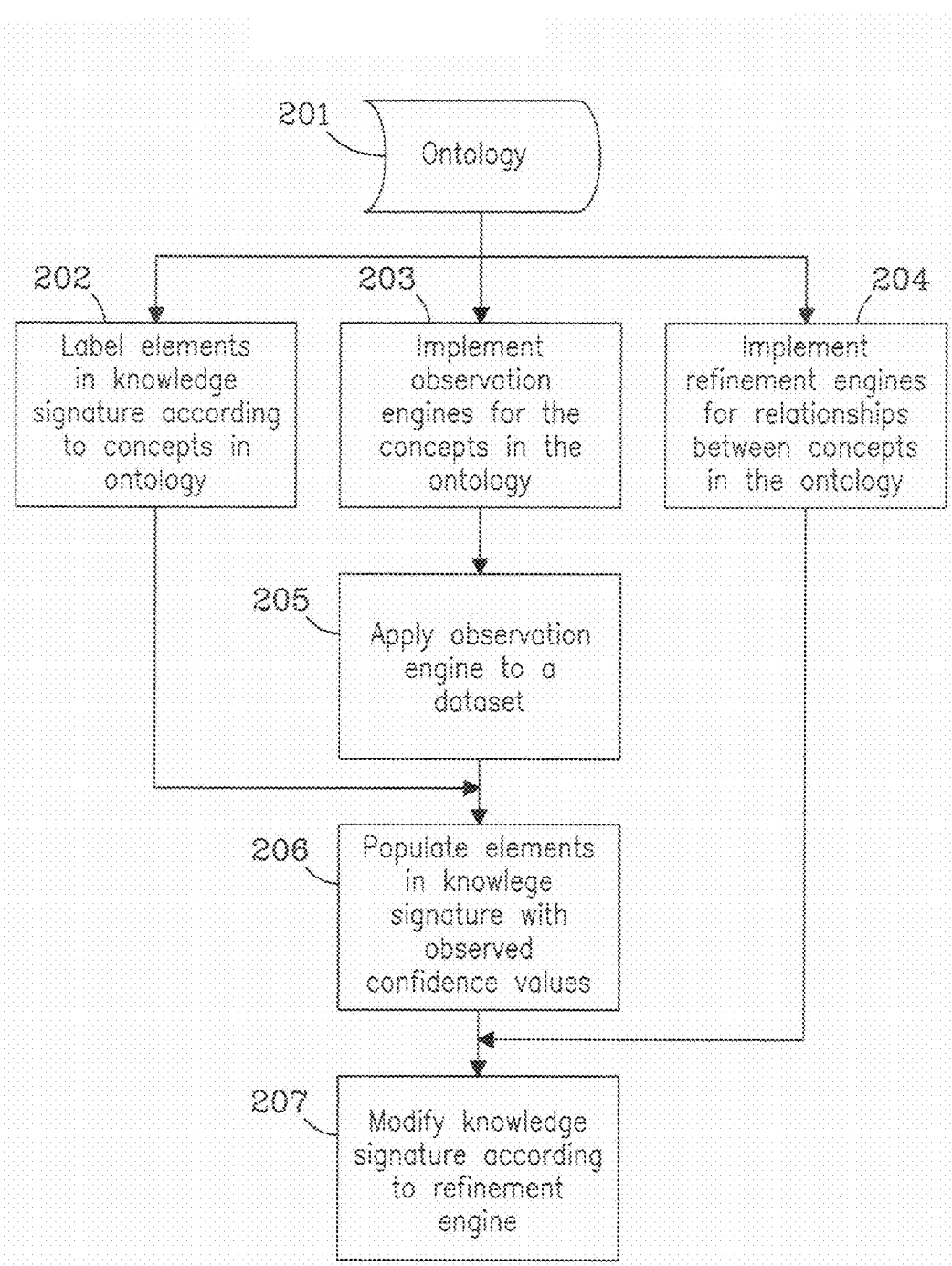
FIG. 2 is a flowchart describing an embodiment of a process for generating knowledge signatures.

According to the embodiment shown in FIG. 2, generation of a knowledge signature can comprise implementing observation engines 203 and refinement engines 204. The observation engines can be based on concepts in an ontology 201 and refinement engines can be based on relationships between concepts. The concepts in the ontology 201 are further utilized to index the knowledge signature by labeling each element with a concept 202. In one embodiment, each concept element in a knowledge signature is associated with at least one observation engine and/or at least one refinement engine. The observation engines are applied to a dataset 205. When an observation engine identifies occurrences of the concept with which it is associated, the observation engine calculates an observed confidence value and populates the associated element with the observed confidence value 206. The observed confidence value represents the confidence that the concept exists in the data set and can comprise values that are, for example, numeric, textual, symbolic, or color-based.

Example

Populating Knowledge Signatures with Observed Confidence Values from Image-Based Data Sets In the present example, the data set comprises images. The elements of a knowledge signature can be labeled according to an ontology about flight vehicles. For each concept in the knowledge signature, an observation engine can be implemented. The observation engines can have computer vision functionality. For example, the observations can utilize a Hough transform algorithm to recognize shapes. Accordingly, one observation engine might recognize a propeller while another might be used to recognize the wings and evaluate whether the wing span is small, medium, or large. If an observation engine observes the presence of a concept, then it can populate the appropriate element with a relatively high confidence value.

Example

Figure 3:
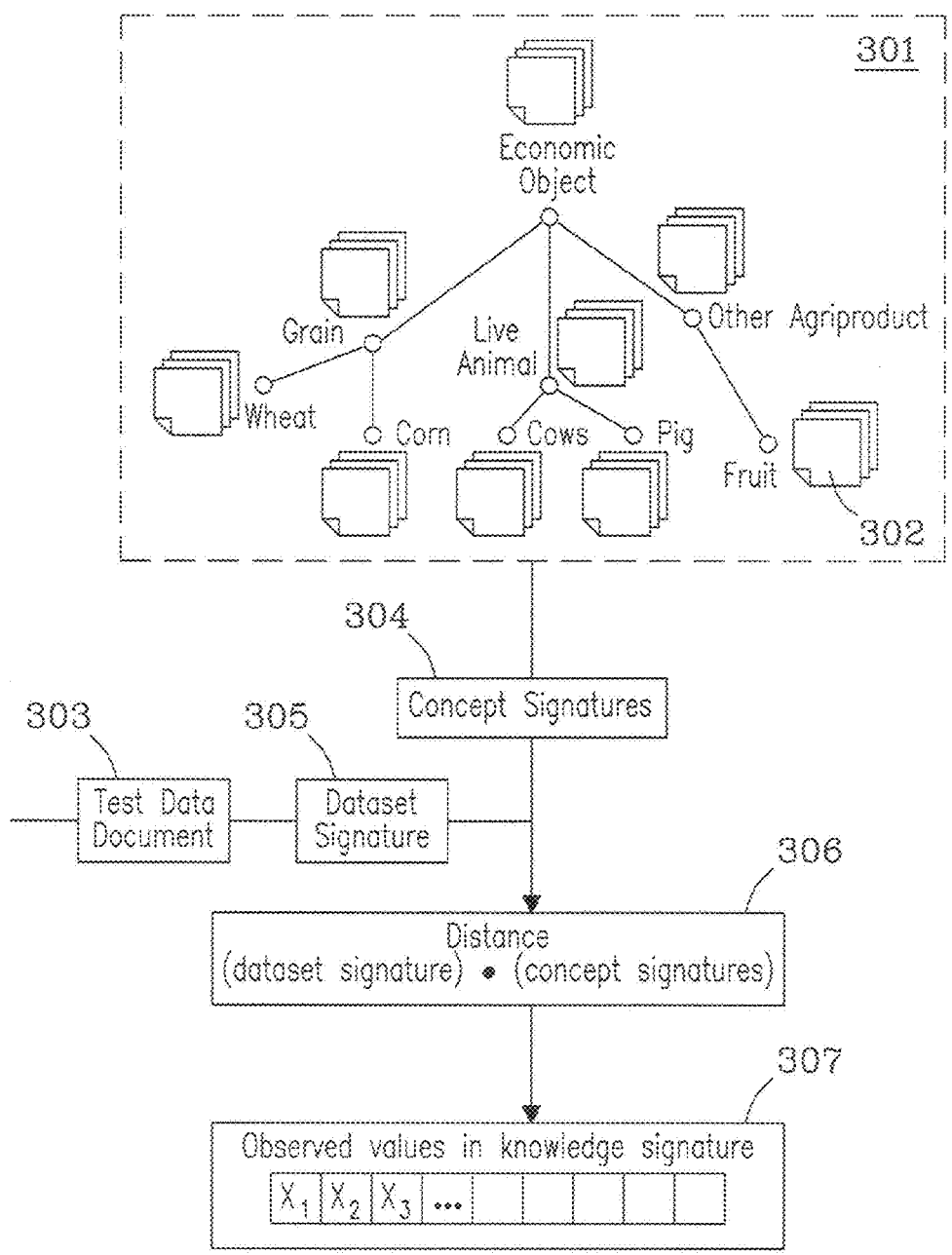
FIG. 3 illustrates an example of populating a knowledge signature.

Populating Knowledge Signatures with Observed Confidence Values Using Concept and Dataset Signatures In the present example, the data set comprises a text document. The ontology, as illustrated in FIG. 3, is a class hierarchy of economic object 301 broken down into three major subclasses—grains, live animals, and other agricultural products. Concept signatures 304 can be generated by first selecting archetypal documents 302 that describe a concept in the ontology (e.g., pig) with respect to the meaning they wish to associate with the concept. "Pig" may end up with one or more archetypal documents. In a preferred embodiment, the documents would focus on "pig" and no other primary topic. Furthermore, the archetypal documents would all be at about the same level of writing complexity. That is, there should not be a description written at a third grade reading level among a group of college-level texts.

Once the archetypal documents have been selected, concept signatures can be instantiated by generating term vectors, where terms are content words from the document. Compact lists of words can be found according to the following:

removing stop words (e.g., is, the, an, a, of);
  grouping terms with identical roots (e.g., troubling, troublesome);
  grouping synonyms (e.g., sole, only, unique);
  identifying key term phrases (e.g., information technology);
  given this set of terms, find the number of times each term occurs in the archetypal documents.

Then, for each concept in the ontology, a vector can be constructed having the following structure:

$$[(term_1, f_1), (term_2, f_2), \ldots],$$

where $term_i$ is a key term or term phrase, and $f_i$ is the respective normalized frequency.

The data set text document 303 can be compared to the ontology by generating a dataset signature 305, which can comprise a term vector calculated in a similar fashion as the concept signatures. Given the term vectors for the document and the concepts in the ontology, a similarity coefficient can be computed 306 between the document and the concepts in the ontology. The coefficients reflect the similarity in corresponding terms and term weights. A knowledge signature can be populated with the coefficients from each concept as observed confidence values 307.

FIG. 3 illustrates the text document 303 entering from the left, to be compared with the ontology concepts 304 in order to calculate a knowledge signature for that document 306, 307. A dataset signature has been calculated from the words and phrases in the document. The dataset signature is compared 306 to the concept signatures for each concept in the ontology. When the dataset signature is compared to a concept signature, only those terms or phrases that are present in the concept signature are compared. If there are additional terms in the concept signature that are not present in the dataset signature, the dataset signature's coefficient for that term is considered to be zero. A similarity measure 306 such as Euclidian distance or cosine coefficients, is calculated between the dataset signature and the concept signature. Each distance measure represents an observed confidence value, which is populated in a knowledge signature 307.

Referring again to FIG. 2, once observed confidence values have been determined, refinement engines modify the knowledge signature 207 based on predefined relationships between concepts. In one embodiment, information about concepts can be recorded in a web ontological language (OWL) document. Refinement engines can alter the confidence value of populated elements according to the presence or absence of related concepts, as characterized by the observed confidence values of those related concepts. Similarly, the refinement engines can infer new confidence values (i.e., inferred confidence values) for unpopulated elements.

By its nature, inferred concepts need not exist in the dataset, but would exist in the information space supported by the data set.

Figure 4:
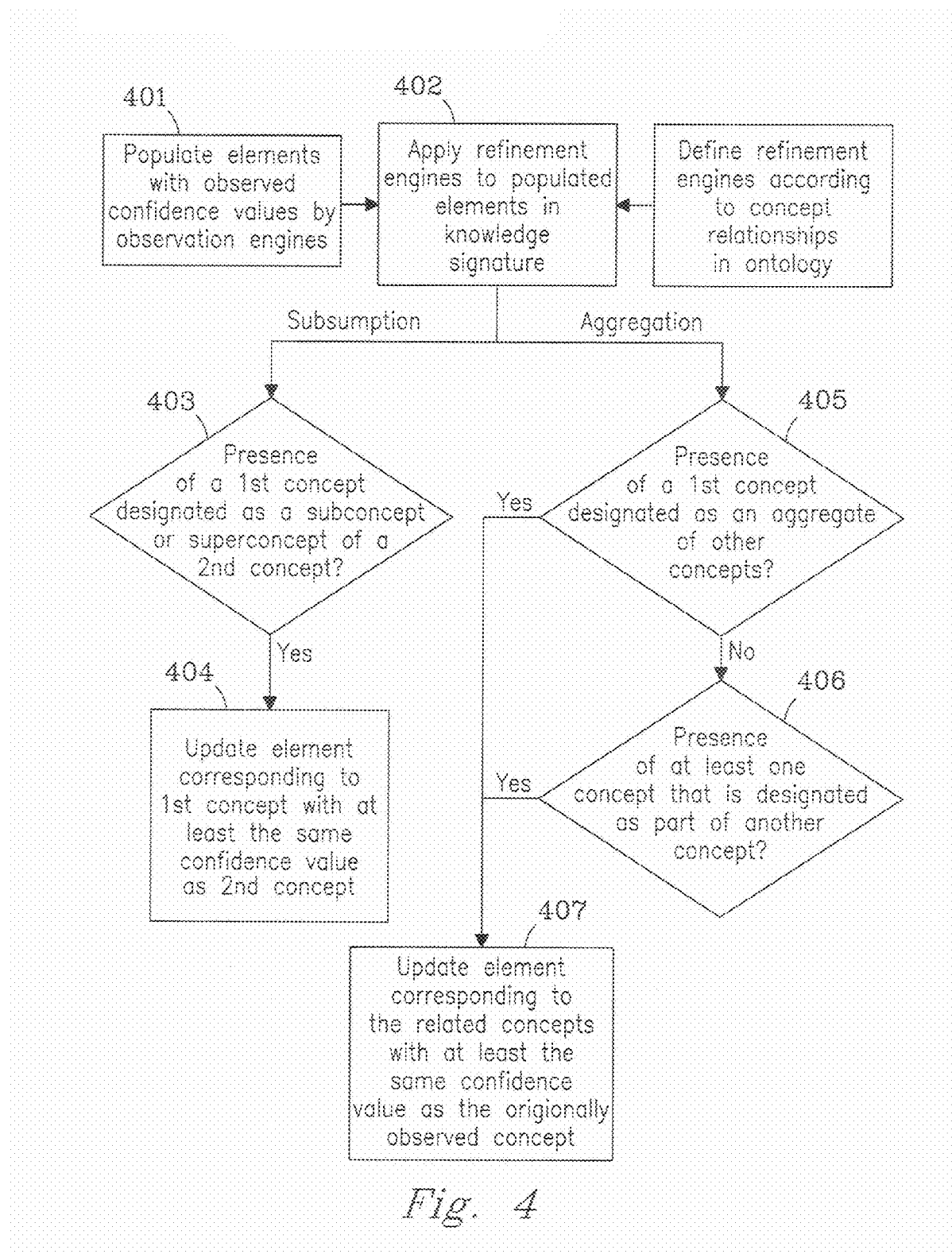
FIG. 4 is a flowchart depicting the operation of a refinement engine.

In one embodiment, as illustrated in FIG. 4, once elements in a knowledge signature are populated with confidence values by observation engines 401, the refinement engines can be applied 402 to update the knowledge signature based on the concept relationship definitions of the refinement engines. A subsumption relationship can exist if a first concept is designated as a subconcept or superconcept of a second concept 403. For example, a first concept can be a musical instrument, which is a superconcept of a second concept, guitars. In such instances, the refinement engine updates the element corresponding to the first concept with at least the same confidence value as that contained in the element corresponding to the second concept 404. Furthermore, if it is known that sub-concepts are disjoint, their confidence values can be summed to determine a minimum presence of a super-concept.

For concepts having an aggregation relationship, the first concept would be designated as an aggregate of other concepts 405. Similarly, at least one concept might be designated as part of another concept 406. If a first concept having an aggregation relationship with other concepts is observed, the refinement engine can update the element(s) corresponding to the related concept(s) with at least the same confidence value as the first concept 407. In one embodiment of an aggregation-type refinement engine, aggregation inferences would require an assumption that the domain is constrained and that there is a single entity of the concept that is of interest. The ontology can specify that the concept-of-interest is restricted to values from a particular target concept for a specified property. The confidence value for the concept of interest should be at most the maximum of the confidence values for all such target concepts. For example, if in order to have a Cabernet it is necessary to have a Red Color and a Medium, then the confidence in having a Cabernet is only as great as the confidence that we have both Red Color and Medium Body. This inference can be made when the confidence value is known for all the target concepts. In these examples, refinement engines are used to improve the breadth and/or accuracy of a knowledge signature's representation of knowledge.

Since knowledge signatures can be generated from data sets of differing types, the types of concepts observed in each knowledge signature may vary. Therefore, in another aspect, refinement engines can be used for inferencing two different knowledge signatures to common concepts, thereby allowing the two knowledge signatures to be more easily compared. For example, a first dataset can comprise images of vehicles in a parking lot. A second dataset can comprise textual descriptions of automobiles. A knowledge signature can be generated from each dataset and be populated by observation engines. FIG. 5a shows these knowledge signatures, wherein all confidence values have been initialized to −1.0. In this particular example, a value of −1.0 represents a lack of information required to make a conclusion. Values between 0 and 1 represent the degree of confidence that a concept exists in the dataset, where 0 denotes a strong confidence that the concept does not exist and 1 denotes a strong confidence that the concept exists. Referring to FIG. 5b, the observation engines can populate the knowledge signatures based on an image of a pickup truck and a text string describing a "Late Model Pick Up." The information observed from the image-based data set is different than that observed from the text-based data set.

The refinement engines can modify the knowledge signatures according to predefined relationships. For example, one definition can define trucks as having long wheelbases. Accordingly, when an observation engine observes a vehicle having a long wheelbase, a refinement engine can populate the truck concept element with a relatively high confidence value, as shown in FIG. 5c. Referring to FIG. 5d, once both knowledge signatures are modified to include confidence values for corresponding concepts, the knowledge signatures can be compared.

Semantic comparison of two knowledge signatures often cannot be accurately computed by a straightforward application of a similarity measure, such as Euclidean distance. This is because some concepts, or concept groups, may be represented by many ontological classes, which can bias the Euclidean distance toward these concept groups and draw emphasis away from other important concepts, or concept groups, that are less numerous. Additionally, some data types, such as text, produce very sparse signatures compared to other data types, such as imagery. The resulting difference in information content can bias the similarity of rich knowledge signatures to other rich ones, and sparse signatures to other sparse ones. Accordingly, before computing a similarity measure between knowledge signatures, one or more mode groups should be selected. Such mode groups, for example, can be based on color concepts, size concepts, and/or shape concepts, and can help avoid topological bias toward dominating concept groups.

Once mode groups have been selected, a reduced dimensional representation of the knowledge signature is computed having dimensionality k, where k is the number of concepts in all the mode groups. A concept may be counted multiple times if it is part of two or more distinct mode groups. The semantic space into which the knowledge signatures are transformed is such that more similar knowledge signatures have a small angle between their reduced representations, whereas dissimilar signatures can have a relatively large angle between their reduced representations.

Figure 6:
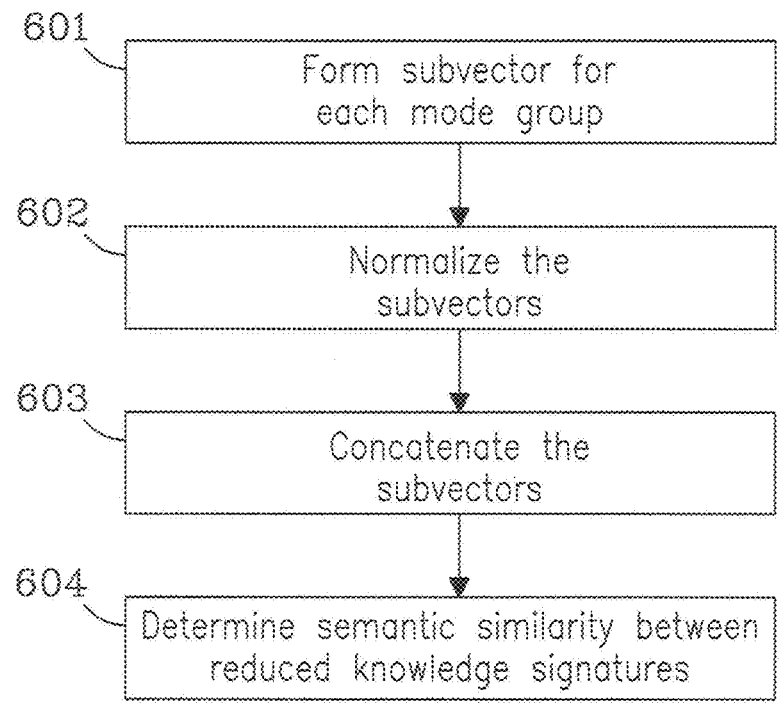
FIG. 6 is a flowchart depicting the operation of a distancing engine.

Referring to FIG. 6, this can be accomplished, in one embodiment, by forming a sub-vector for each mode group 601 consisting of just the concept strength measures for that mode group, normalizing them 602, and then concatenating 603. This operation is equivalent to a linear transformation. The resulting reduced dimensional representation is a vector with a length equal to the square root of n, where n is the number of mode groups. The semantic distance between these reduced knowledge signatures can be computed 604 using Euclidean distance due to the fact that the reduced vectors lie on the surface of a hyper-sphere with radius equal to the square root of n, on which the dot product of two reduced vectors is equivalent to the Euclidean distance between them for distancing purposes. According to one variation, exact and approximate nearest-neighbor queries can be quickly performed on large databases of knowledge signatures by indexing their reduced representations in existing data structures such as $k_d$-trees, box-decomposition trees, and locality sensitive hash tables.

Figure 7:
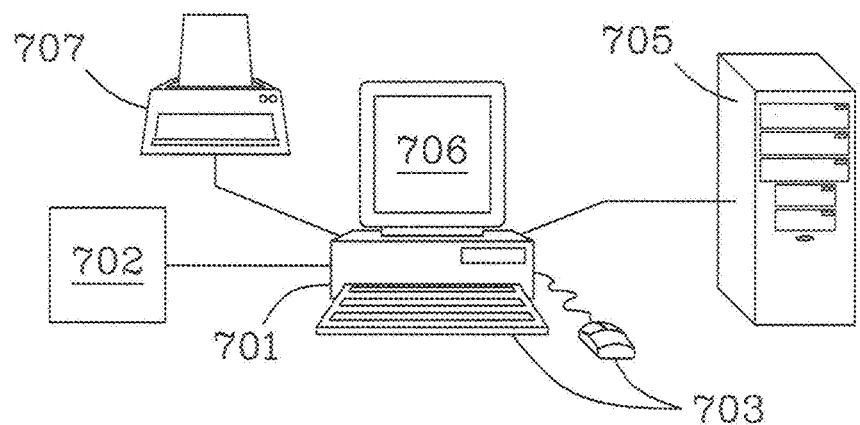
FIG. 7 is a diagram of a computer system.

One aspect of the present invention encompasses an apparatus comprising a knowledge representation unit. Referring to FIG. 7, an exemplary knowledge representation unit can include a computer system 701 having a machine-recognizable representation for knowledge signatures along with definitions and algorithms for calculating, comparing, and recording those signatures within a specific domain. Embodiments of the present invention also encompass a client-server architecture. The representation language can be based on the Uniform Resource Identifier (URI), Extensible Markup Language (XML), and/or the Resource Description Framework (RDF), which RDF builds on URI and XML.

The computer system 701 can include a variety of external peripherals 703, and at least one data receiving device 702 connected thereto. The data receiving devices can be external or internal to the computer. The computer includes a processor and associated memory. The memory typically includes a main memory that is typically implemented as RAM, a static memory such as ROM, and a storage device such as a magnetic and/or optical disk. The processor communicates with each of these forms of memory through an internal bus. The external peripherals can include a data entry device such as a keyboard, and a pointing or cursor control device such as a mouse, trackball, pen, or the like. One or more display devices, such as a CRT monitor or an LCD screen, provide a visual display of information including the various components of the user interface. A network connection can provide the computer with access to one or more servers 705, which may function as gateways, file storage systems, messaging systems and the like. Each of these external peripherals communicates with the CPU via one or more input/output ports on the computer.

Data sets can be received through the data-receiving devices 702 and stored in the memory. The data receiving devices can include, but are not limited to audio sensors, video sensors, scanner, image sensors, optical character recognition devices, keyboards, pointing devices, network cards, and modems. Accordingly, data sets can comprise information from sources such as text documents, images, audio segments, video segments, database records, graphs, and the interne. Ontologies covering relevant domains can also be stored in the memory. Alternatively, in a client-server architecture, the ontologies, the data sets, or both can be stored on a server.

The processor communicates with the data-receiving devices and/or the memory to generate knowledge signatures according to machine-recognizable instructions for performing the methods described herein. The resulting knowledge signatures and knowledge-signature comparisons can be outputted to a display 706 and/or printer 707 for viewing by a user such as an analyst.

Figure 8:
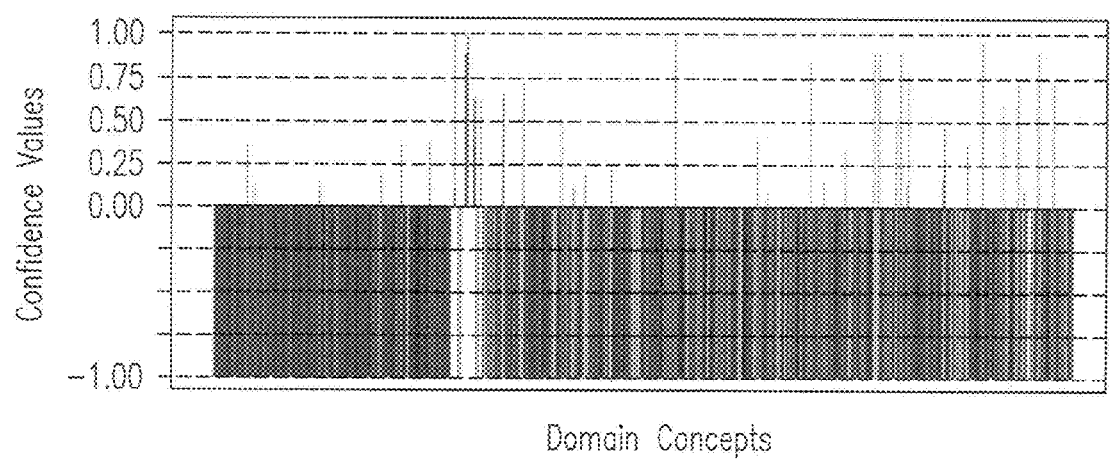
FIG. 8 is an illustration of an example of a displayed knowledge signature.

One embodiment of a visual representation of a knowledge signature, which can be displayed and/or printed, is shown in FIG. 8. The values along the x-axis are concept-labeled elements. The y-values are the plotted confidence values.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A non-transitory computer-readable medium having stored thereon a knowledge signature, the knowledge signature derived from an ontology and comprising a matrix structure having elements labeled according to concepts in the ontology stored on a computer-readable medium, wherein elements labeled with concepts related in the ontology are grouped into mode groups and the value of the element represents a confidence that the concept is present in an information space according to an observation engine comprising a program module configured to recognize a particular concept within the data set and a refinement engine comprising a program module configured to infer the presence of concepts related through the ontology to those recognized by the observation engine, each mode group comprising a group of concepts within the knowledge signature that are related in the ontology and are semantically disjoint.

2. The non-transitory computer-readable medium as recited in claim 1, wherein the knowledge signature comprises a real-valued vector.

3. An apparatus comprising a knowledge representation unit comprising at least one ontology stored on a non-transitory computer-readable medium, at least one data-receiving device, a processor communicably connected to the computer readable medium and the data-receiving devices that generates knowledge signatures derived from the at least one ontology by comparing datasets obtained by the data-receiving devices to the ontologies at least one ontology, at least one observation engine populating the knowledge signatures with observed values based on recognition of particular concepts within the datasets according to the at least one ontology, and at least one refinement engine modifying the knowledge signatures with derived values based on inferences on the presence of concepts related through the at least one ontology to those recognized by the observation engine.

4. The apparatus as recited in claim 3, further comprising a distancing engine, wherein the processor performs a similarity measure between a plurality of knowledge signatures according to the distancing engine.

5. The apparatus as recited in claim 3, wherein the data-receiving devices are selected from the group consisting of audio sensors, video sensors, scanners, image sensors, optical character recognition devices, keyboards, pointing devices, network cards, modems, and combinations thereof.

6. The apparatus as recited in claim 3, wherein the datasets are selected from the group consisting of text documents, images, audio segments, video segments, database records, graphs, and combinations thereof.

7. The apparatus as recited in claim 3, further comprising a display whereon knowledge signatures are represented as graphs having concept labels on the abscissa and confidence values on the ordinate.

8. The apparatus as recited in claim 3, further comprising a communications port allowing the knowledge representation unit to interface with computational devices, said communications port supporting wired or wireless communications.

9. The apparatus as recited in claim 8, further comprising a computational device communicably connected to the knowledge representation unit, wherein the computational device receives knowledge signatures.

\* \* \* \* \*